United States Patent
Han et al.

(10) Patent No.: US 10,848,746 B2
(45) Date of Patent: Nov. 24, 2020

(54) APPARATUS INCLUDING MULTIPLE CAMERAS AND IMAGE PROCESSING METHOD

(71) Applicant: SAMSUNG ELECTRONICS CO., LTD., Suwon-si (KR)

(72) Inventors: Seung-Min Han, Suwon-si (KR); Kai Guo, Suwon-si (KR); Seong-Wook Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/547,435

(22) Filed: Aug. 21, 2019

(65) Prior Publication Data

US 2020/0195910 A1 Jun. 18, 2020

(30) Foreign Application Priority Data

Dec. 14, 2018 (KR) .......................... 10-2018-0162147

(51) Int. Cl.
*H04N 13/271* (2018.01)
*H04N 13/239* (2018.01)
*G06T 7/593* (2017.01)
*H04N 13/156* (2018.01)
*H04N 13/00* (2018.01)

(52) U.S. Cl.
CPC ........... *H04N 13/271* (2018.05); *G06T 7/593* (2017.01); *H04N 13/156* (2018.05); *H04N 13/239* (2018.05); *G06T 2207/20084* (2013.01); *G06T 2207/20221* (2013.01); *H04N 2013/0081* (2013.01)

(58) Field of Classification Search
CPC .. H04N 13/271; H04N 13/239; H04N 13/156; H04N 2013/0081; G06T 7/593; G06T 2207/20221; G06T 2207/20084
USPC ........................................................... 348/43
See application file for complete search history.

(56) References Cited

U.S. PATENT DOCUMENTS

| | | | |
|---|---|---|---|
| 9,720,089 B2 | 8/2017 | Katz et al. | |
| 9,900,584 B2 | 2/2018 | Nisenzon | |
| 9,918,072 B2 | 3/2018 | Kim et al. | |
| 2016/0050407 A1* | 2/2016 | Chen | G06T 7/571 |
| | | | 348/47 |
| 2016/0142627 A1 | 5/2016 | Chou et al. | |
| 2016/0212411 A1 | 7/2016 | Lindner et al. | |
| 2016/0295193 A1 | 10/2016 | Van Nieuwenhove et al. | |

(Continued)

FOREIGN PATENT DOCUMENTS

| | | |
|---|---|---|
| KR | 10-2014-0135416 | 11/2014 |
| KR | 10-1609188 | 3/2016 |

(Continued)

*Primary Examiner* — Allen C Wong
(74) *Attorney, Agent, or Firm* — Volentine, Whitt & Francos, PLLC

(57) ABSTRACT

An apparatus includes a first camera module providing a first image of an object with a first field of view, a second camera module providing a second image of the object with a second field of view different from the first field of view, a first depth map generator that generates a first depth map of the first image based on the first image and the second image, and a second depth map generator that generates a second depth map of the second image based on the first image, the second image, and the first depth map.

20 Claims, 14 Drawing Sheets

(56) References Cited

U.S. PATENT DOCUMENTS

2016/0381289 A1* 12/2016 Kim ........................ G06T 7/285
                                                                    348/38
2018/0059225 A1    3/2018 Zhu et al.

FOREIGN PATENT DOCUMENTS

KR         10-1739394      5/2017
KR     10-2017-0106325     9/2017

* cited by examiner

APPARATUS INCLUDING MULTIPLE CAMERAS AND IMAGE PROCESSING METHOD

CROSS-REFERENCE TO RELATED APPLICATION

This application claims the benefit of Korean Patent Application No. 10-2018-0162147, filed on Dec. 14, 2018 in the Korean Intellectual Property Office, the subject matter of which is hereby incorporated by reference.

BACKGROUND

The inventive concept relates to an apparatus(es) including multiple cameras and method(s) of operating same.

Digital cameras have become a very popular consumer product. Most smart phones include a digital camera, and the functions and capabilities provided by the digital camera have become important product differentiators.

Early digital cameras provided only basic capture, storage, and transmission capabilities. However, consumer demand has driven continuing expansion and improvement of digital camera performance. Exceptional image quality is a strong consumer expectation. New features, effects and functions are also demanded. Accordingly, research is ongoing into various image effects that may be applied to a captured image.

SUMMARY

Embodiments of the inventive concept provide apparatus(es) including multiple cameras and methods of operating the same, wherein the multiple camera provide different images of the same object taken from different fields of views.

According to an aspect of the inventive concept, there is provided an apparatus including; a first camera module configured to obtain a first image of an object with a first field of view, a second camera module configured to obtain a second image of the object with a second field of view different from the first field of view, a first depth map generator configured to generate a first depth map of the first image based on the first image and the second image, and a second depth map generator configured to generate a second depth map of the second image based on the first image, the second image, and the first depth map.

According to another aspect of the inventive concept, there is provided a method of processing an image of an electronic apparatus. The method includes; obtaining a first image of an object using a first camera module, obtaining a second image of the object using a second camera module, generating a first depth map of the first image based on the first image and the second image, estimating a relationship between a primary region of the second image and a residual region of the second image based on the first image and the second image, and generating a second depth map of the second image based on the estimated relationship between the primary region and the residual region, and the first depth map.

According to another aspect of the inventive concept, there is provided an operating method for an electronic apparatus. The electronic apparatus includes a first camera module providing a first image of an object using a first field of view and a second camera module providing a second image of the object using second field of view wider than the first field of view, and a processor generating a depth map of the second image based on a primary region of the second image and a residual region of the second image. The operating method includes; generating a first depth map of the primary region by estimating a relationship between the first image and the second image, estimating a relationship between the primary region and the residual region based on the first image and the second image, generating a second depth map of the second image by estimating a depth map of the second region based on the estimated relationship between the primary region and the residual region, and generating a depth map of the second image by fusing the first depth map and the second depth map.

BRIEF DESCRIPTION OF THE DRAWINGS

Embodiments of the inventive concept will be more clearly understood from the following detailed description taken in conjunction with the accompanying drawings in which.

DETAILED DESCRIPTION

Embodiments of the inventive concept may be better understood upon consideration of the following detailed description taken in conjunction with the accompanying drawings.

Figure 1:
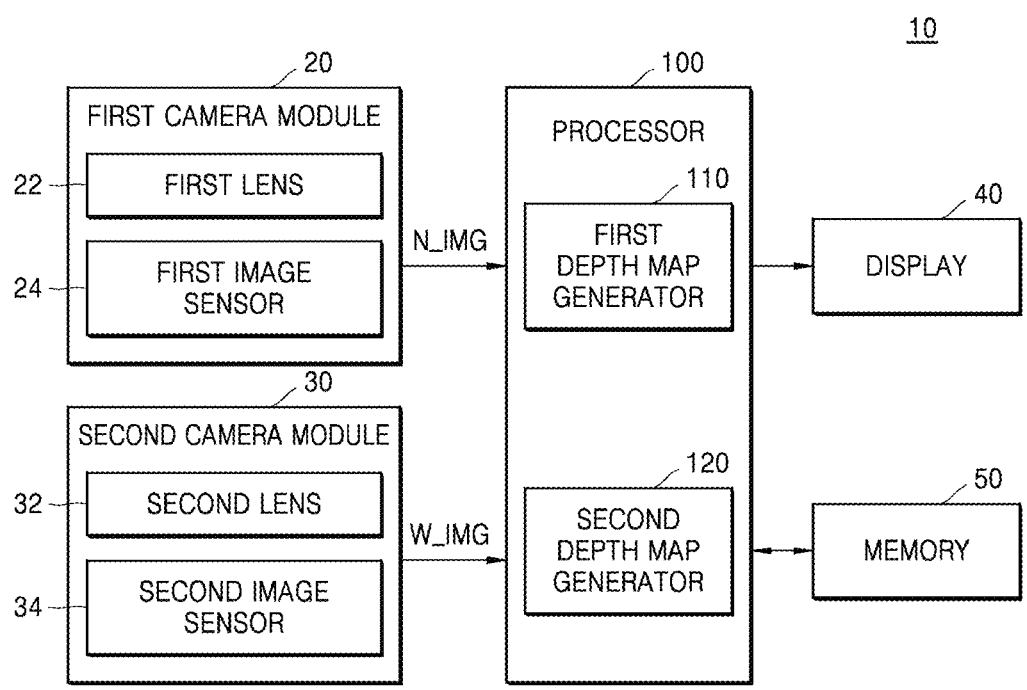
FIG. 1 is a block diagram illustrating an electronic apparatus according to an embodiment of the inventive concept.

FIG. 1 is a block diagram illustrating an electronic apparatus 10 according to an embodiment of the inventive concept.

Referring to FIG. 1, the electronic apparatus 10 may include a first camera module 20, a second camera module 30, a display 40, a memory 50, and a processor 100. As a non-limited example, the electronic apparatus 10 may include at least one of a smart phone, a tablet personal computer (PC), a mobile phone, an image telephone, an e-book reader, a desktop PC, a laptop PC, a netbook computer, a workstation, a personal digital assistant (PDA), a portable multimedia player (PMP), an MP3 player, a mobile medical device, a camera, and a wearable device. The wearable device may be classified into an accessary-type wearable device such as a watch, a ring, a bracelet, an anklet, a necklace, glasses, contact lenses, or a head-mounted-device (HMD), and a transplant-type wearable device such as an implantable circuit.

The first camera module 20 and the second camera module 30 may be used to capture the image of a subject (hereafter, "an object") external to the electronic apparatus 10 and generate corresponding image data. Here, the first camera module 20 may include a first lens 22 and a first image sensor 24, and the second camera module 30 may include a second lens 32 and a second image sensor 34.

The first lens 22 and the second lens 32 may be used to concentrate light reflected from the object. Each of the first lens 22 and the second lens 32 may include at least one of a zoom lens and a focus lens. That is, the first lens 22 and the second lens 32 may have different imaging fields of view. For example, the first lens 22 may have a relatively narrower view angle than the second lens 32. Alternately expressed, the second lens 32 may have a relatively wider view angle than the first lens 22. Accordingly, the second camera module 30 may generate a wide-angle image of the object—relative to a narrow-angle image generated by the first camera module 20. That is, while imaging the same object, the first camera module 20 may generate a first image or narrow image N_IMG, i.e., a narrow-angle image, and the second camera module 30 may generate a second image or a wide image W_IMG, i.e., a wide-angle image.

The first image sensor 24 and the second image sensor 34 may respectively be used to convert "light" (i.e., electromagnetic energy from designated bandwidth(s)) concentrated by the first lens 22 and the second lens 32 into corresponding electrical signals, and thereafter image data. For this purpose, in each of the first image sensor 24 and the second image sensor 34, a vast plurality of pixels may arranged in a two dimensional matrix.

One of a plurality of reference colors may be allotted to each of the plurality of pixels. For example, the of reference colors may include red, green, and blue (RGB) or red, green, blue, and white. As one example, the first image sensor 24 and the second image sensor 34 may be implemented by using charge-coupled devices (CCD) or complementary metal-oxide-semiconductors (CMOS). The image data generated by the first image sensor 24 and the second image sensor 34 may be referred to as an image frame or frame data. The first image sensor 24 and the second image sensor 34 may generate new image data at predetermined time intervals. A frequency corresponding to a period in which a new image is generated may be referred to as a frame rate. That is, the frame rate may represent the number of image data items newly generated per unit time.

Although not shown, each of the first camera module 20 and the second camera module 30 may further include an image signal processor capable of performing one or more processing operations on the generated image data. In addition, the first camera module 20 and the second camera module 30 may further include at least one of a shutter, an aperture, an analog front end (AFE), and a timing generator (TG).

The display 40 may display various contents (e.g., text, image, video, icon, and/or symbol) to a user in response to a first image signal generated by the first camera module 20 and/or a second image signal generated by the second camera module 30. The display 40 may include a liquid crystal display (LCD), a light emitting diode (LED) display, an organic light emitting diode (OLED) display, a micro-electro-mechanical systems (MEMS) display, or an electronic paper display. In addition, the display 40 may include a touch screen. For example, the display 40 may receive a touch, a gesture, an approach, or a hovering input using an electronic pen or a part of the body of the user.

The memory 50 may be used to store various types of data including; (e.g.,) operating system (OS) program(s), application program(s), image data, and other data variously generated and/or used by the electronic apparatus 10. The memory 50 may include at least one of a volatile memory and a non-volatile memory. The non-volatile memory may include read only memory (ROM), programmable ROM (PROM), electrically programmable ROM (EPROM), electrically erasable and programmable ROM (EEPROM), a flash memory, phase-change random access memory (PRAM), magnetic RAM (MRAM), resistive RAM (RRAM), and ferroelectric RAM (FRAM). The volatile memory may include dynamic RAM (DRAM), static RAM (SRAM), and synchronous DRAM (SDRAM). In addition, according to an embodiment, the memory 50 may include at least one of a hard disk drive (HDD), a solid state drive (SSD), a compact flash (CF) memory, a secure digital (SD) memory, a micro-SD memory, a mini-SD memory, an extreme digital (xD) memory, and a memory stick. The memory 50 may semi-permanently or temporarily store program(s) and/or instruction(s) to be executed by the processor 100.

The processor 100 may be used to control operations of the electronic apparatus 10. The processor 100 may be a central processing unit (CPU), and may include a single processor core or a number of processor cores. The processor 100 may process or execute programs and/or data stored in the memory 50. For example, the processor 100 may control a function of the electronic apparatus 10 by executing the programs stored in the memory 50.

As illustrated in the example of FIG. 1, the processor 100 may include a first depth map generator 110 and a second depth map generator 120. Here, the first depth map generator 110 may generate a first depth map of the first image N_IMG based on the first image N_IMG and the second image W_IMG. For example, the first depth map generator 110 may analyze distance relationships between the first image N_IMG and the second image W_IMG in order to generate the first depth map of the first image N_IMG.

In certain embodiments of the inventive concept, the term "depth map" denotes a data structure (e.g., a table) including depth information for a region corresponding to at least one portion of an image. The term "depth" refers to information corresponding to a degree of binocular disparity between a left eye image and a right eye image. Thus, the depth of an image allows variation of a three-dimensional effect as sensed by a user. That is, when depth is large (i.e., relatively great) and binocular disparity increases accordingly, the three-dimensional effect increases. Alternately, when depth is small (i.e., relatively little) and binocular disparity decreases accordingly, the three-dimensional effect decreases.

In certain embodiments of the inventive concept, the depth map may correspond to a two-dimensional image of a gray scale that represents the depth of each pixel in an image.

A designated region may be divided according to units of pixels, or may be further divided according to previously set regions greater than the units of pixels. Thus, the second W_IMG may be divided into a region that overlaps the first image N_IMG and a remaining portion of the second region W_IMG. For example, the first depth map generator 110 generates a first depth map of the first region and the second depth map generator 120 may generate a second depth map of the second image W_IMG by estimating a second depth map of the second region.

Accordingly, in one approach consistent with certain embodiments of the inventive concept, the second depth map generator 120 may generate the second depth map of the second image W_IMG based on the first image N_IMG, the second image W_IMG, and the first depth map. For example, the second depth map generator 120 may estimate a relationship between the first region and the second region of the second image W_IMG based on the first image N_IMG and the second image W_IMG. The second depth map generator 120 may estimate the depth map of the second region based on the estimated relationship between the first region and the second region and the first depth map. For example, the second depth map generator 120 may estimate the relationship between the first region and the second region, or estimate the depth map of the second region based on a neural network model.

The first depth map generator 110 and the second depth map generator 120 may be implemented with different (or varying) shapes. The first depth map generator 110 and the second depth map generator 120 may be respectively implemented as software and/or hardware. For example, when the first depth map generator 110 and the second depth map generator 120 are implemented as hardware, the first depth map generator 110 and the second depth map generator 120 respectively receive the first image N_IMG and the second image W_IMG and may include circuits capable of generating the first depth map and the second depth map. Alternately or additionally, when the first depth map generator 110 and the second depth map generator 120 are implemented as software, programs and/or commands stored (e.g.,) in the memory 50 and executed by the processor 100, operation(s) generating the first depth map and the second depth map may be performed.

In certain embodiments of the inventive concept, the processor 100 may further include a depth map fusion unit capable of generating a third depth map of the second image W_IMG by performing a fusion operation based on the first depth map provided by the first depth map generator 110 and the second depth map provided by the second depth map generator 120. The depth map fusion unit may generate the second depth tone-mapped to the first depth map by performing a bias removing operation on the second depth map. For example, the depth map fusion unit may generate the third depth map by performing the fusion operation on the tone-mapped second depth map and the first depth map. As another example, the depth map fusion unit may generate the propagated first depth map in the second image W_IMG by repeatedly propagating the first depth map based on the first depth map and the second image W_IMG and may generate the third depth map by performing the fusion operation on the propagated first depth map and the tone-mapped second depth map.

Figure 2:
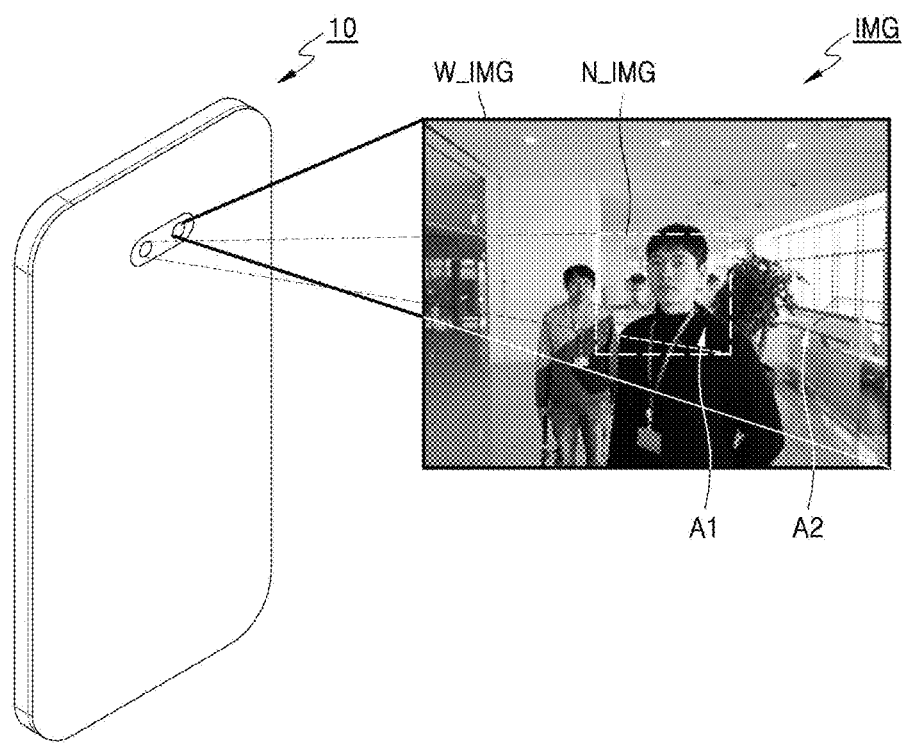
FIG. 2 is a conceptual diagram further illustrating an operating method for the electronic apparatus according to an embodiment of the inventive concept.

FIG. 2 is a conceptual diagram illustrating one possible approach to the operation of the electronic apparatus 10 obtaining of an image according to embodiments of the inventive concept.

Referring to FIG. 2, the electronic apparatus 10 may obtain the first image N_IMG and the second image W_IMG by capturing an image IMG of an object using the first camera module 20 and the second camera module 30 of FIG. 1. For example, the electronic apparatus 10 may obtain the first image N_IMG of the object using the first camera module 20, and may obtain the second image W_IMG of the object using the second camera module 30. In illustrated example of FIG. 2, the second image W_IMG is divided into a first region A1 that overlaps the first image N_IMG and a second region A2 that includes the remaining portion of the first region A1. Hereafter, a captured image IMG (e.g., the wide-angle image W_IMG of FIG. 2) may be described as including: (1) a "primary region" (e.g., the narrow-angle image N_IMG or a first region A1 designated within the captured image IMG), and a "residual region" (e.g., the remaining portion(s) of the captured image IMG outside of the primary image).

Figure 3:
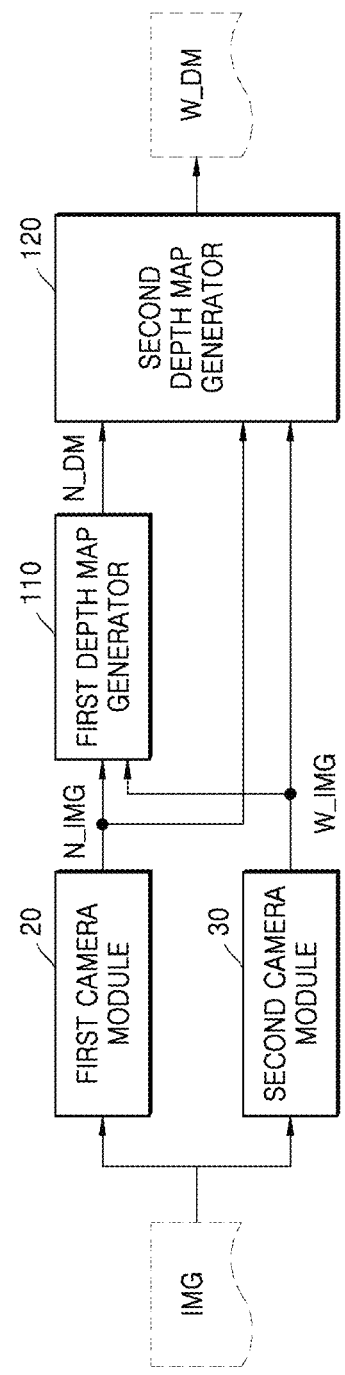
FIGS. 3 and 4 are respective block diagrams further illustrating operation of the electronic apparatus according to an embodiment of the inventive concept.

FIG. 3 is a block diagram further illustrating operation of the electronic apparatus 10 according to certain embodiments of the inventive concept.

Referring to FIGS. 1, 2 and 3, upon capturing the image IMG of the same object, the first camera module 20 may obtain the first image N_IMG and the second camera module 30 may obtain the second image W_IMG. Accordingly, the first camera module 20 may provide the first image N_IMG to the first depth map generator 110 and the second depth map generator 120. In addition, the second camera module 30 may provide the second image W_IMG to the first depth map generator 110 and the second depth map generator 120.

The first depth map generator 110 may generate the first depth map N_DM based on the first image N_IMG and the second image W_IMG and provide the first depth map N_DM to the second depth map generator 120. In one embodiment, the first depth map generator 110 analyses distance relationships between the first image N_IMG and the second image W_IMG in order to generate the first depth map N_DM. That is, the first depth map generator 110 may set matching points in the first image N_IMG and the second image W_IMG and then analyse a distance relationship between the matching points. In one possible approach, the first depth map generator 110 may analyze a distance relationship between the first image N_IMG and the second image W_IMG based on a stereo vision method and may generate the first depth map N_DM of the first image N_IMG.

The second depth map generator 120 may generate the second depth map W_DM based on the first image N_IMG, the second image W_IMG, and the first depth map N_DM, as described hereafter in some additional detail.

Figure 4:
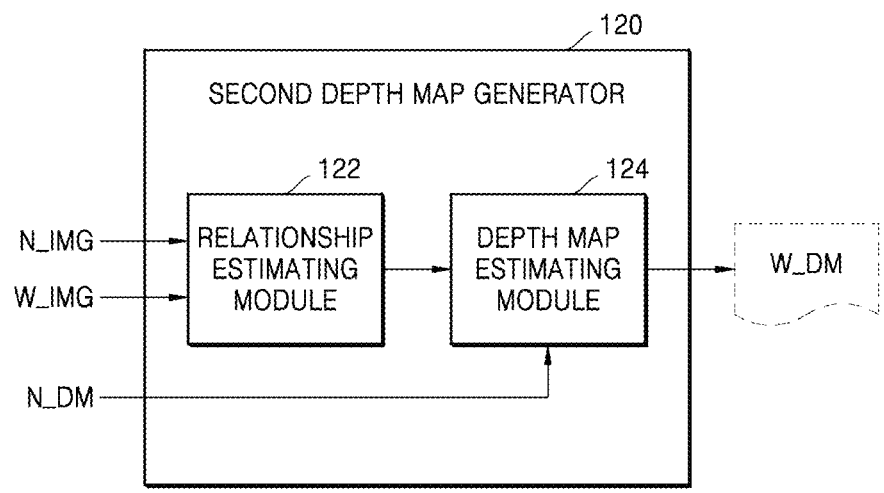

FIG. 4 is a block diagram further illustrating in one example the second depth map generator 120 according to an embodiment of the inventive concept.

Referring to FIG. 4, the second depth map generator 120 may include a relationship estimating module 122 and a depth map estimating module 124. In an exemplary embodiment, the relationship estimating module 122 may estimate a relationship between the first region A1 (the primary region) and the second region A2 (the residual region) of the second image W_IMG based on the first image N_IMG and the second image W_IMG. For example, the relationship estimating module 122 may adopt a neural network model and estimate relationship(s) between the first region A1 and the second region A2 based on the learned neural network model.

In one embodiment, the depth map estimating module 124 may estimate the depth map of the second region A2 based on the relationship between the first region A1 and the second region A2, as estimated by the relationship estimating module 122, and the first depth map N_DM. For example, the depth map estimating module 124 may adopt the neural network model and estimate the depth map of the second region A2 based on the learned neural network model. The second depth map generator 120 may generate the second depth map W_DM of the second image W_IMG based on the estimated depth map of the second region A2 and the first depth map N_DM.

Figure 5:
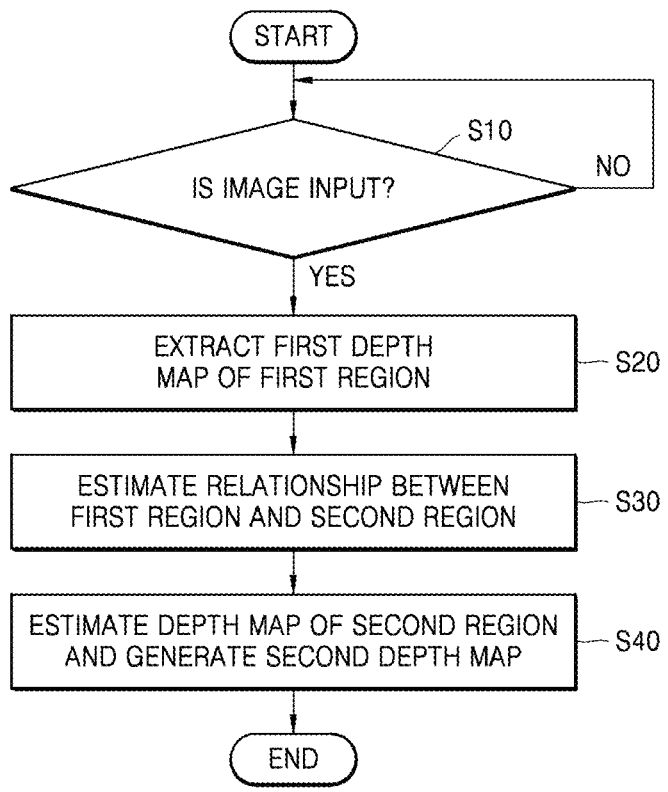
FIG. 5 is a flowchart summarizing in one example a method of operating an electronic apparatus according to an embodiment of the inventive concept.

FIG. 5 is a flowchart summarizing one possible operation of the electronic apparatus (e.g., an image processing method of an electronic apparatus) according to certain embodiments of the inventive concept.

Referring to FIGS. 1, 2, 3, 4, and 5, the electronic apparatus 10 may determine whether an image IMG has been input (S10). For example, based on an external control signal (e.g., a user activation), the electronic apparatus 10 may capture an object using the first camera 20 and the second camera 30 to provide the first image N_IMG and the second image W_IMG of the object.

When the first image N_IMG and the second image W_IMG are received (S10=YES), the electronic apparatus 10 may extract the first depth map N_DM of the first region A1 that is common to the first image N_IMG from the second image W_IMG (S20). For example, the first depth map N_DM may be extracted by the first depth map generator 110 that receives the first image N_IMG and the second image W_IMG.

Next, the relationship between the first region A1 and the second region A2 of the second image W_IMG may be estimated (S30). In an exemplary embodiment, the relationship between the first region A1 and the second region A2 may be estimated by the relationship estimating module 122 that receives the first image N_IMG and the second image W_IMG. For example, the relationship estimating module 122 may estimate the relationship based on the neural network model.

Next, the depth map of the second region A2 is estimated and the second depth map W_DM may be generated based on the estimated depth map of the second region A2 (S40). In an exemplary embodiment, the depth map of the second region A2 may be estimated by the depth map estimating module 124 that receives the relationship between the first region A1 and the second region A2, which is estimated by the relationship estimating module 122, and the first depth map N_DM. For example, the depth map estimating module 124 may estimate the depth map based on the neural network model. In addition, the depth map estimating module 124 may generate the second depth map W_DM of the second image W_IMG based on the first depth map N_DM of the first region A1 and the estimated depth map of the second region A2.

Figure 6:
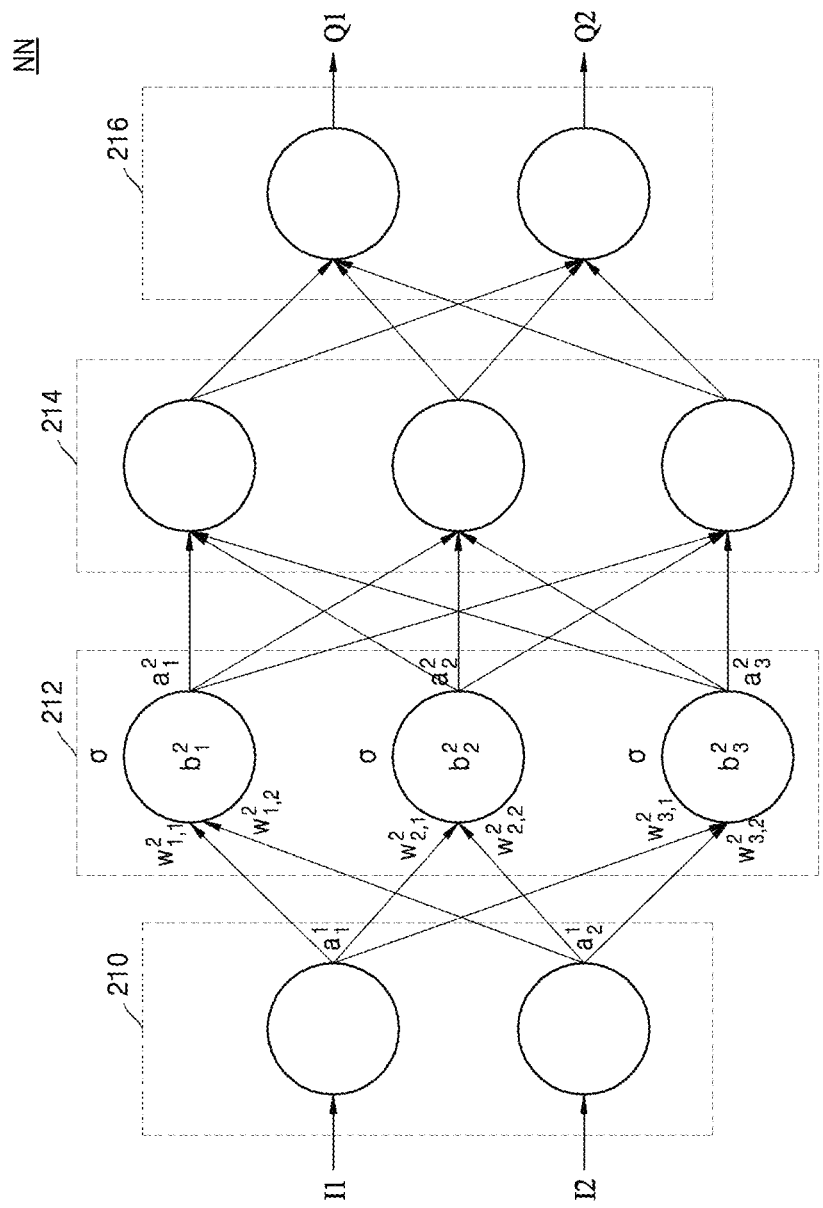
FIG. 6 is a conceptual diagram illustrating the used of a neural network adopted by an embodiment of the inventive concept.

FIG. 6 is a conceptual diagram illustrating one example of a neural network NN that may be adopted by embodiments of the inventive concept as part of a relationship estimating module and/or a depth map estimating module.

Referring to FIG. 6, the neural network NN may include an input layer, hidden layers, and an output layer. The neural network NN may perform an operation based on received input data (e.g., I1 and I2) in order to generate output data (e.g., Q1 and Q2). Referring to the illustrated examples of FIGS. 4, 5 and 6, the neural network NN is adopted by the relationship estimating module 122, receives the first image N_IMG and the second image W_IMG as input data, and generates analysis information regarding relationship(s) (hereafter, "relationship information") between the first image N_IMG and the second image W_IMG as output data. Additionally or alternatively, the neural network NN is adopted by the depth map estimating module 124, receives the relationship information between the first image N_IMG and the second image W_IMG and the first depth map N_DM as input data, and generates the depth map of the second region A2 as output data.

The neural network NN may be a deep neural network (DNN) or an n-layer neural network including two or more hidden layers. For example, as illustrated in FIG. 6, the neural network NN may be the DNN including an input layer 210, first and second hidden layers 212 and 214, and an output layer 216. The DNN may be a convolution neural network (CNN), a recurrent neural network (RNN), a deep belief network, or a restricted Boltzmann machine. However, the inventive concept is not limited thereto.

When the neural network NN is the DNN, since more layers capable of extracting valid information are included, the neural network NN may process relatively complicated data sets. On the other hand, the neural network NN illustrated in FIG. 6 includes layers 210, 212, 214, and 216, but this is just one possible example. The neural network NN may include more or less layers. In addition, the neural network NN may include layers having various structures different from those illustrated in FIG. 6.

Each of the layers 210, 212, 214, and 216 included in the neural network NN may include a plurality of neurons. The neurons may correspond to a plurality of artificial nodes referred to as processing elements (PE), units, or similar terms. For example, as illustrated in FIG. 6, the input layer 210 may include two neurons (nodes) and each of the first and second hidden layers 212 and 214 may include three neurons (nodes), which is only an example. Each of the layers included in the neural network NN may include a varying number of neurons (nodes).

The neurons included in each of the layers included in the neural network NN are connected to each other and may exchange data. A neuron may receive data from other neurons, may operate the received data, and may output the operation result to other neurons.

An input and an output of each of the neurons (nodes) may be referred to as input activation and output activation. That is, the activation may be a parameter corresponding to an output of a neuron and inputs of neurons included in a next layer. On the other hand, each of the neurons may determine activation thereof based on activations and weights that are received from the neurons included in a previous layer. The weight as a parameter used for calculating output activation in each neuron may be a value allotted to a connection relationship between the neurons.

Each of the neurons may be processed by a computational unit or a processing element for receiving an input and outputting activation. The input and output of each of the neurons may be mapped. For example, σ is an activation function and $W_{j,k}^{i}$ may be a weight value from a kth neuron included in an (i−1)th layer to a jth neuron included in an ith layer. $b_j^i$ is a bias value of a jth neuron included in the ith layer, and $a_j^i$ may be referred to as activation of the jth neuron of the ith layer, that is, post activation. The post activation $a_j^i$ may be calculated by using the following Equation 1.

$$a_j^i = \sigma\left(\sum_k (W_{j,k}^i \times a_k^{i-1}) + b_j^i\right) \quad \text{[Equation 1]}$$

As illustrated in FIG. 6, post activation of a first neuron of the first hidden layer 212 may be represented as $a_1^2$. In addition, $a_1^2$ may have a value of $a_1^2=\sigma(W_{1,1}^2 \times a_1^1 + W_{1,2}^2 \times a_2^1 + b_1^2)$. That is, the post activation may be a value obtained by applying the activation function to the sum of activations received from a previous layer. Equation 1 is only an example for describing the activation and the weight used for processing data in the neural network NN. The inventive concept is not limited thereto.

Figure 7:
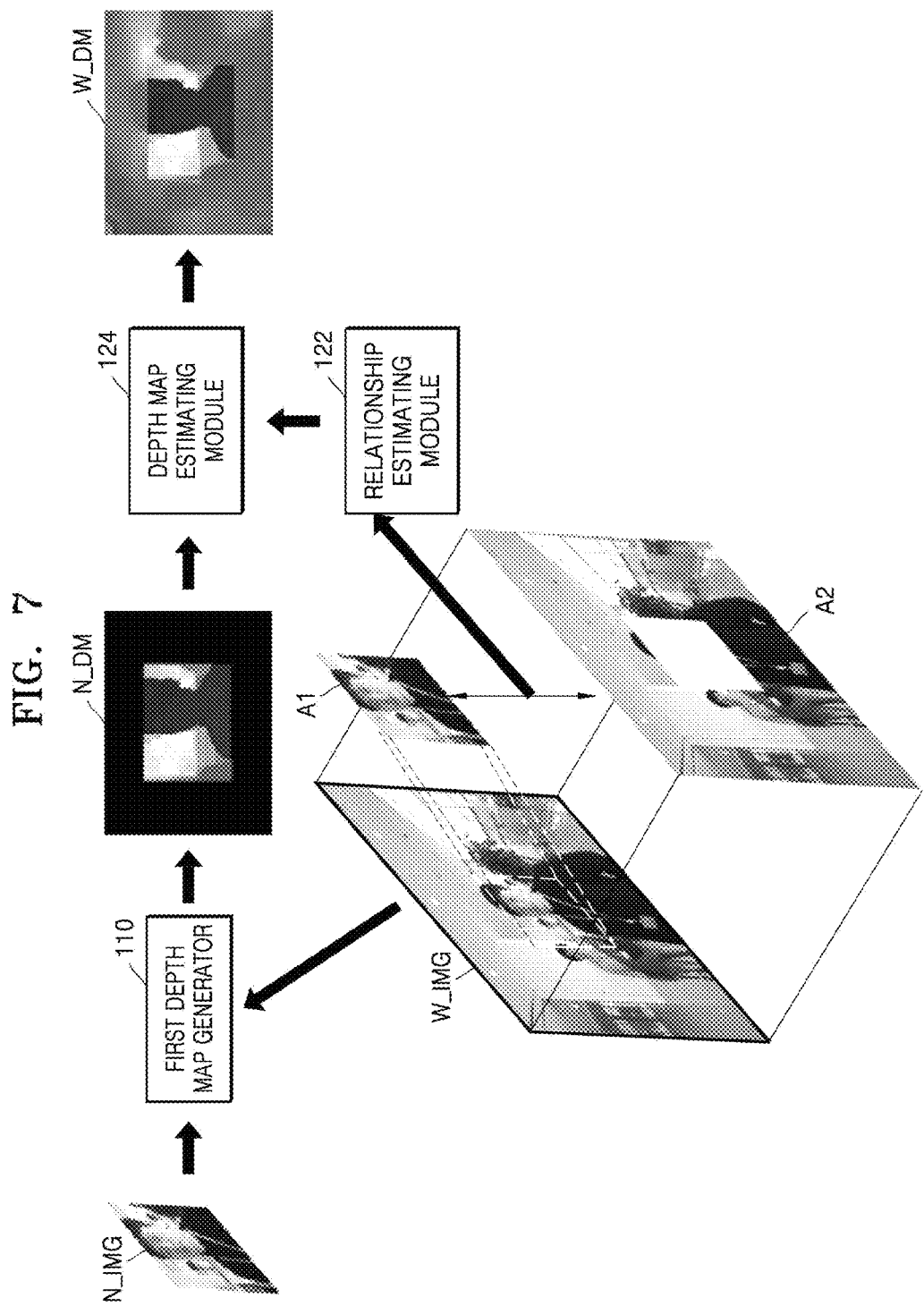
FIGS. 7, 11 and 13 are respective conceptual diagrams, each further illustrating one example of an operating method for the electronic apparatus according to an embodiment of the inventive concept.

FIG. 7 is another conceptual diagram illustrating one possible example of generating a depth map according to an embodiments of the inventive concept.

Referring to FIG. 7, the first image N_IMG and the second image W_IMG are provided to the first depth map generator 110, so that the first depth map generator 110 may generate the first depth map N_DM of the first image N_IMG. Here, for example, the first depth map generator 110 may analyse a distance relationship between the first image N_IMG and the second image W_IMG using a stereo vision method, and may generate the first depth map N_DM having high picture quality of the first image N_IMG based on the analysed distance relationship.

As with the previous illustrated example of FIG. 2, the second image W_IMG is divided into the first (primary) region A1 and the second (residual) region A2. In an embodiment like the one described in relation to FIG. 4, the relationship estimating module 122 is used to estimate the relationship between the first region A1 and the second region A2 based on the neural network method. For example, the relationship estimating module 122 is assumed to adopt the neural network receives pixel data of the first region A1 and the second region A2 as input data, and generate the relationship between the first region A1 and the second region A2 as output data based on the input data.

The relationship between the first region A1 and the second region A2, which is generated by the relationship estimating module 122, and the first depth map N_DM are provided to the depth map estimating module 124. The depth map estimating module 124 may estimate the depth map of the second region A2 based on the relationship between the first region A1 and the second region A2 and the first depth map N_DM. In one exemplary embodiment, the depth map estimating module 124 may estimate the depth map of the second region A2 based on the neural network method. For example, the depth map estimating module 124 that adopts the neural network NN receives the relationship between the first region A1 and the second region A2 and the first depth map N_DM as input data and may generate the depth map of the second region A2 as output data based on the input data. The depth map may generate the second depth map W_DM of the second image W_IMG based on the estimated depth map of the second region A2 and the first depth map N_DM.

Figure 8:
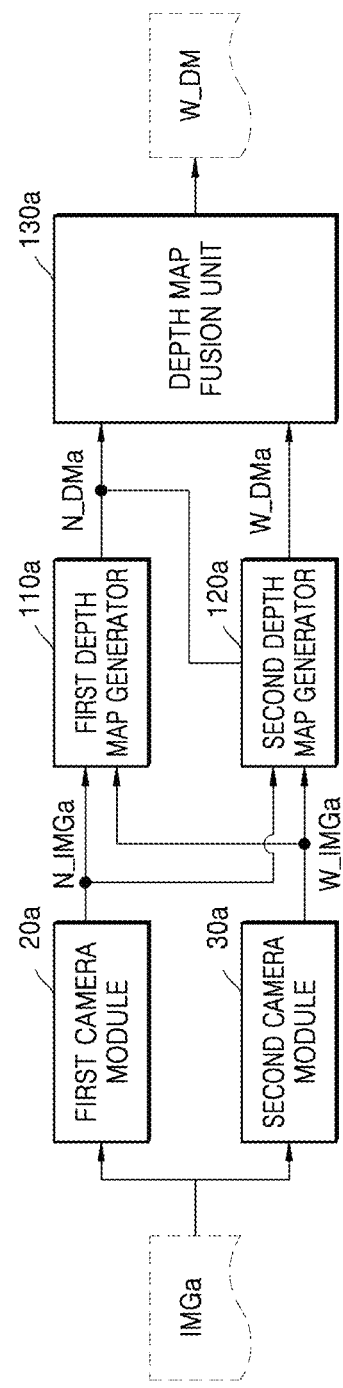
FIGS. 8 and 9 are respective block diagrams illustrating possible variations in an electronic apparatus according to an embodiments of the inventive concept.

FIG. 8 is a block diagram further illustrating another example of the operation of the electronic apparatus 10 according to embodiments of the inventive concept. Comparing the illustrated embodiments of FIGS. 3 and 8, like components are denoted with analogous reference numbers. However, in the embodiment of FIG. 8 the electronic apparatus 10 further includes a depth map fusion unit 130a as compared with the embodiment of FIG. 3. Here, the depth map fusion unit 130a may be used to generate a third depth map I_DMa of a second image W_IMGa by performing the fusion operation based on a first depth map N_DMa and a second depth map W_DMa. For example, the depth map fusion unit 130a performs a previously set operation on the first depth map N_DMa and the second depth map W_DMa, performs the fusion operation on the first depth map N_DMa and the second depth map W_DMa on which the previously set operation is performed, and may generate the third depth map I_DMa of the second image W_IMGa with improved picture quality. The depth map fusion unit 130a may perform a pre-processing operation, a fusion operation, and a post-processing operation on the first depth map N_DMa and the second depth map W_DMa. For example, the depth map fusion unit 130a may perform a tone mapping operation as the pre-processing operation and a depth map correcting operation as the post-processing operation, as described later.

Figure 9:
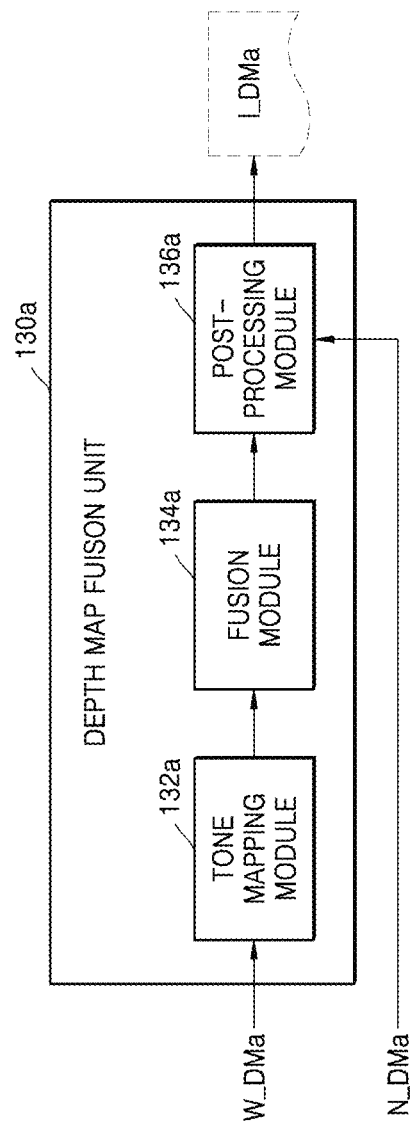

FIG. 9 is a block diagram further illustrating in one example the depth map fusion unit 130a of FIG. 8.

Referring to FIG. 9, the depth map fusion unit 130a may include a tone mapping module 132a, a fusion module 134a, and a post-processing module 136a. In an exemplary embodiment, the tone mapping module 132a may perform a tone mapping operation between the depth map of the first region A1 of the second image W_IMGa and the depth map of the second region A2 of the second image W_IMGa based on the second depth map W_DMa. The second depth map W_DMa may include a depth map of the first region A1 with high picture quality and a depth map of the second region A2 with low picture quality. That is, the tone mapping module 132a may perform the tone mapping operation between a depth map having high picture quality and a narrow field of view (the depth map of the first region A1) and a depth map having low picture quality and a wide field of view (the depth map of the second region A2). For example, the tone mapping module 132a may generate a tone-mapped second depth map by performing a bias removing operation on the second depth map W_DMa.

The fusion module 134a may perform the fusion operation on the tone-mapped second depth map and the first depth map N_DMa. The fusion module 134a may generate a third depth map of the second image W_IMGa by performing the fusion operation on the tone-mapped second depth map and the first depth map N_DMa based on various fusion algorithms.

The post-processing module 136a may generate the post-processed third depth map I_DMa by performing the post-processing operation on the third depth map generated by the fusion module 134a. For example, the post-processing module 136a may perform a filtering operation on an interface generated in the third depth map in accordance with the fusion operation of the fusion module 134a. That is, the post-processing module 136a may perform a processing operation on the interface formed between the depth map of the first region A1 with high picture quality and the depth map of the second region A2 with intermediate picture quality.

The post-processing module 136a may include a bilateral filter. The post-processing module 136a may perform the processing operation on the interface based on the bilateral filter. Here, the post-processing module 136a may perform the filtering operation on the interface by removing noise while keeping an edge through the bilateral filter, and the post-processing module 136a may include at least one of a Gaussian filter and a Median filter.

The post-processing module 136a may include a domain transform (DT) filter. The post-processing module 136a may remove or block artifacts generated in the depth map in accordance with fusion based on the DT filter. For example, the artifacts may mean abnormal depth such as artificial spot and defect formed in the depth map.

Figure 10:
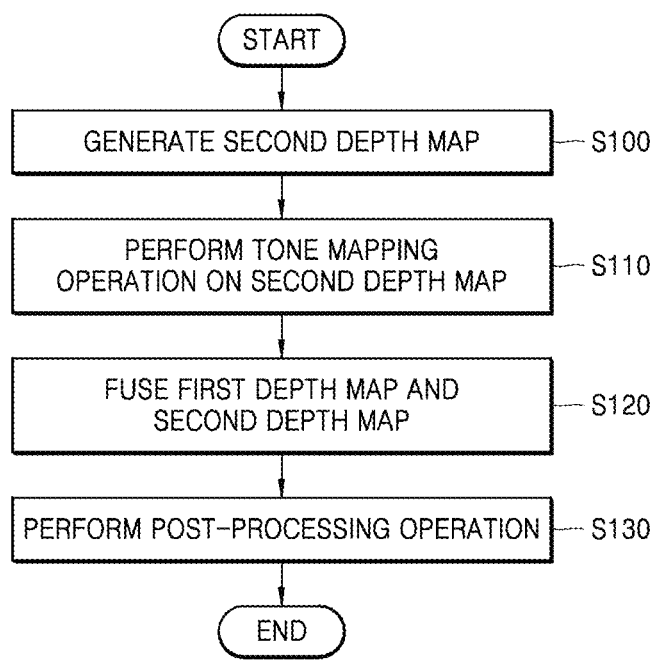
FIG. 10 is a flowchart summarizing in another example a method of operating an electronic apparatus according to an embodiment of the inventive concept.

FIG. 10 is a flowchart summarizing in one example an operating method for the electronic apparatus 10 (e.g., an image processing method for the electronic apparatus 10) according to embodiments of the inventive concept.

Referring to FIG. 10, the electronic apparatus 10 may generate the second depth map W_DMa of the second image W_IMGa (S100). Here, the electronic apparatus 10 may generate the second depth map W_DMa including the depth map of the first region A1 and the depth map of the second region A2 based on the first image N_IMGa having a narrow field of view and the second image W_IMGa having a wide field of view. That is, the electronic apparatus 10 may generate the second depth map W_DMa including the depth map of the first region A1 with high picture quality and the depth map of the second region A2 with low picture quality based on the first image N_IMGa and the second image W_IMGa.

Next, the electronic apparatus 10 may perform a tone mapping operation on the second depth map W_DMa (S110). For example, the electronic apparatus 10 includes the tone mapping module 132a and the tone mapping module 132a may perform the tone mapping operation between the depth map of the first region A1 of the second image W_IMGa and the depth map of the second region A2 of the second image W_IMGa based on the second depth map W_DMa. Therefore, the tone mapping operation may be performed between the depth map having the high picture quality and the narrow field of view and the depth map having the low picture quality and the wide field of view.

Next, the electronic apparatus 10 may perform the fusion operation on the tone-mapped second depth map and the first depth map N_DMa (S120). For example, the electronic apparatus 10 includes the fusion module 134a and the fusion module 134a may generate the third depth map of the second image W_IMGa by performing the fusion operation on the tone-mapped second depth map and the first depth map N_DMa based on the fusion algorithm.

Next, the electronic apparatus 10 may perform the post-processing operation on the third depth map generated by the fusion module 134a (S130). For example, the electronic apparatus 10 may include the post-processing module 136a, where the post-processing module 136a is used to generate the post-processed third depth map I_DMa by performing the post-processing operation on the third depth map generated by the fusion module 134a. Here, the post-processing module 136a may perform the filtering operation on the interface generated in the third depth map in accordance with the fusion operation of the fusion module 134a. In addition, the post-processing module 136a may remove or block the artifacts generated in the third depth map in accordance with the fusion operation of the fusion module 134a.

Figure 11:
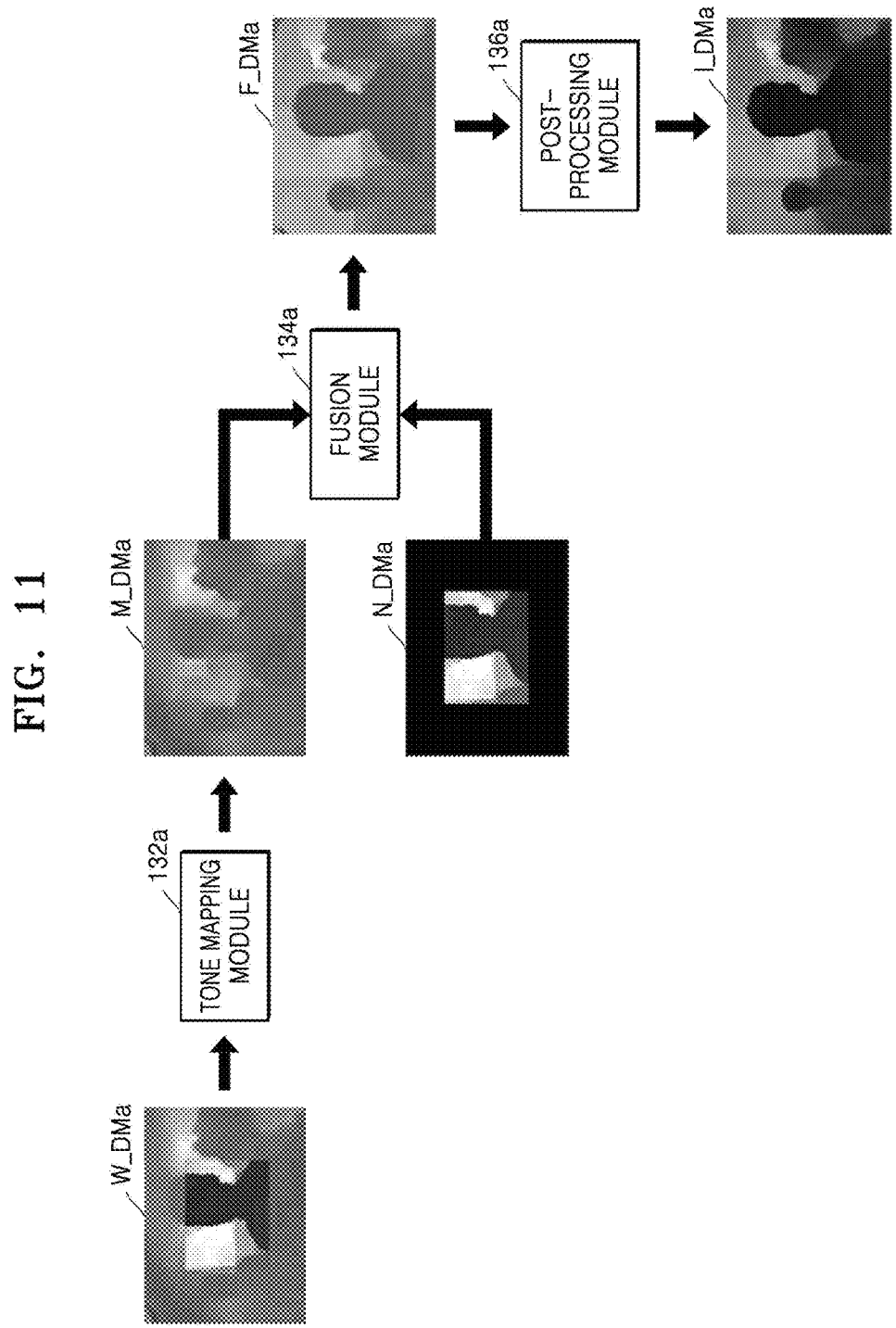

FIG. 11 is another conceptual diagram illustrating another example of depth map fusion according to embodiments of the inventive concept.

Referring to FIG. 11, the second depth map W_DMa is provided to the tone mapping module 132a and the tone mapping module 132a may generate the tone-mapped second depth map M_DMa. Here, the second depth map W_DMa may include the depth map having the high picture quality and the narrow field of view and the depth map having the low picture quality and the wide field of view. The tone mapping module 132a may generate the tone-mapped second depth map M_DMa between the depth map having the high picture quality and the narrow field of view and the depth map having the low picture quality and the wide field of view by performing the bias removing operation on the second depth map W_DMa.

Next, the tone-mapped second depth map M_DMa and the first depth map N_DMa may be input to the fusion module 134a. The fusion module 134a may generate the third depth map F_DMa of the second image W_IMGa by performing the fusion operation on the tone-mapped second depth map M_DMa and the first depth map N_DMa.

Next, the third depth map F_DMa may be input to the post-processing module 136a. The post-processing module 136a may generate the post-processed third depth map I_DMa by performing various post-processing operations on the third depth map F_DMa. For example, the post-processing module 136a may perform the filtering operation on the interface generated in the third depth map F_DMa in accordance with the fusion operation of the fusion module 134a. In addition, for example, the post-processing module 136a may remove or block the artifacts generated in the third depth map F_DMa in accordance with the fusion operation of the fusion module 134a.

Therefore, the electronic apparatus 10 described in certain embodiments of the inventive concept may generate a depth map of an image that forms a wide angle based on images having different fields of view. In addition, a depth map having improved picture quality may be generated by generating the depth map of the image that forms the wide angle based on a relationship between the images having the different fields of view.

Figure 12:
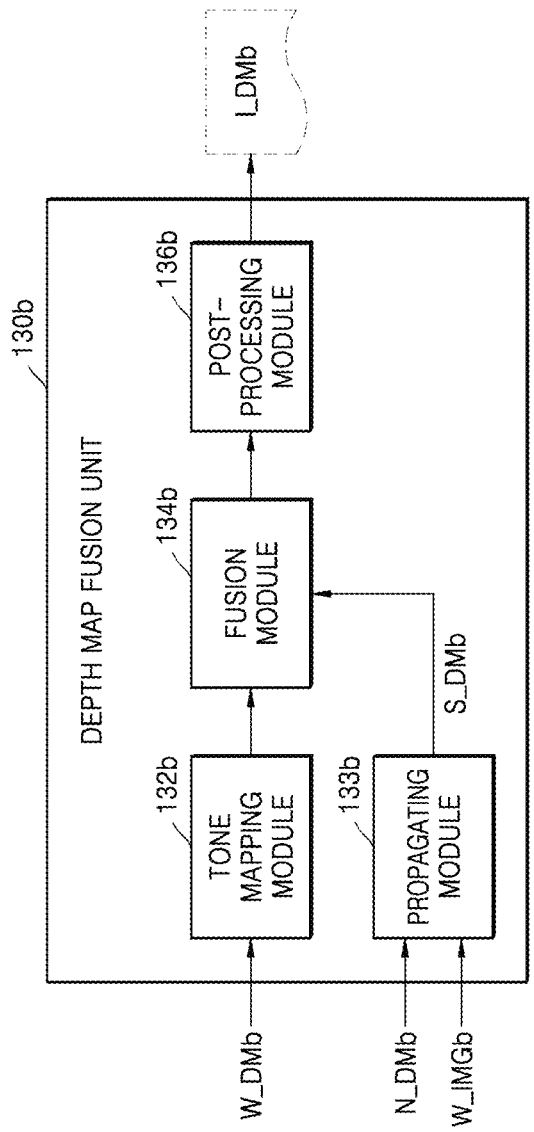
FIG. 12 is a block diagram further illustrating a depth map fusion unit according to an embodiment of the inventive concept.

FIG. 12 is a block diagram illustrating the depth map fusion unit of FIG. 8 according to an embodiments of the inventive concept. The embodiment of FIG. 9 may be consider and compared with the embodiment of FIG. 12.

Referring to FIG. 12, a depth map fusion unit 130b may further include a propagating module 133b. Here, the propagating module 133b may generate a propagated first depth map S_DMb in a second image W_IMGb based on a first depth map N_DMb and the second image W_IMGb. For example, with respect to the second image W_IMGb divided into a first region A1 and a second region A2, the propagating module 133b may iterated propagate the first depth map N_DMb corresponding to the first region A1 to the second region A2. In an exemplary embodiment, the propagating module 133b includes a domain-converting filter and may perform the iterated propagation operation based on the domain-converting filter.

In an exemplary embodiment, a fusion module 134b may perform the fusion operation on the tone-mapped second depth map and the propagated first depth map S_DMb. The fusion module 134b may generate a third depth map of the second image W_IMGb by performing the fusion operation on the tone-mapped second depth map and the propagated first depth map S_DMb based on a previously set fusion algorithm.

Figure 13:
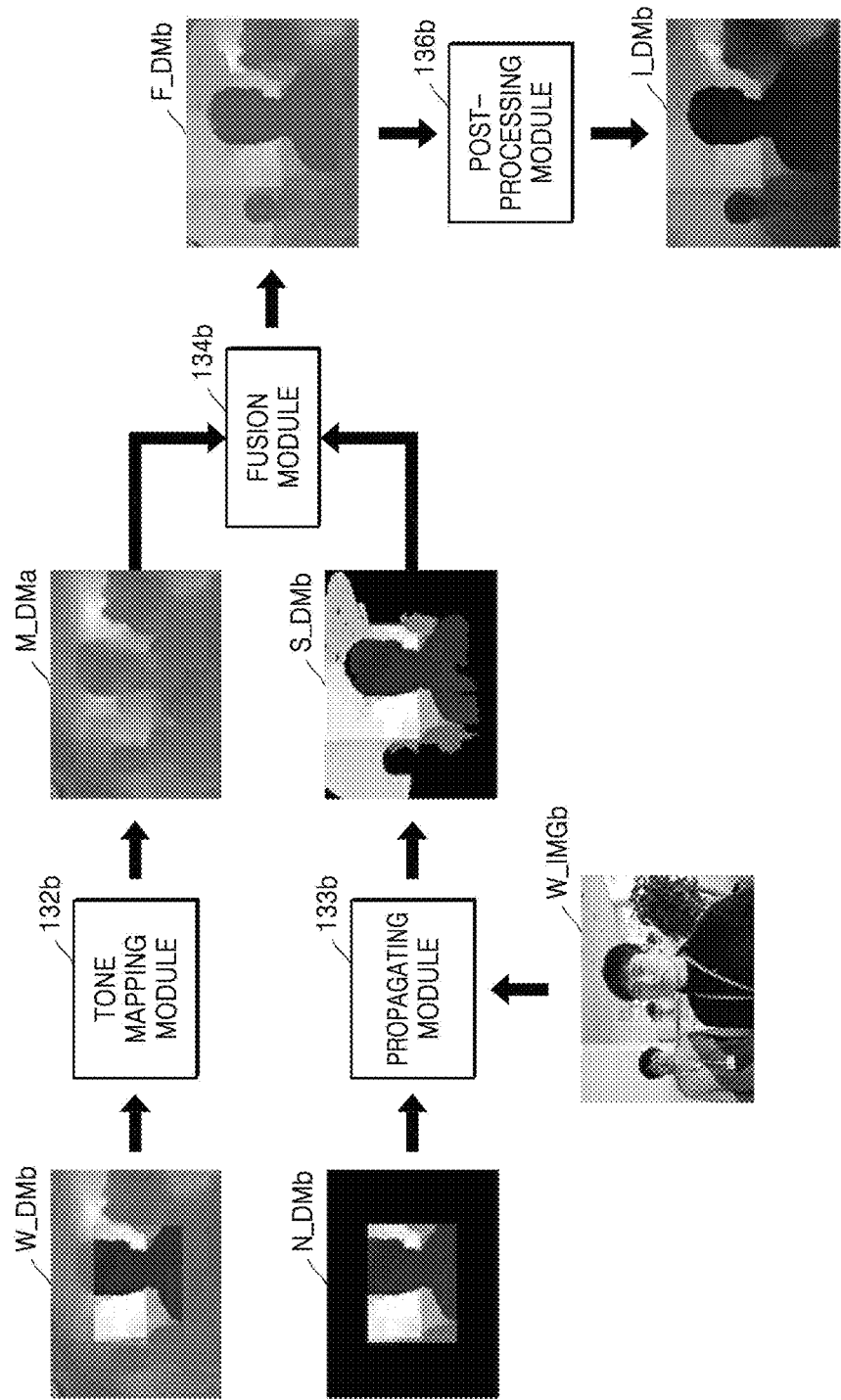

FIG. 13 is still another conceptual diagram illustrating one example of depth map fusion according to embodiments of the inventive concept. FIG. 13 should be considered and compared with the example of FIG. 11.

Referring to FIG. 13, the first depth map N_DMb and the second image W_IMGb are input to the propagating module 133b and the propagating module 133b may generate the propagated first depth map S_DMb in the second image W_IMGb. For example, the propagating module 133b may generate the propagated first depth map S_DMb by iterated propagating the first depth map N_DMb corresponding to the first region A1 in the second image W_IMGb to the second region A2.

Next, the propagated first depth map S_DMb and the tone-mapped second depth map M_DMb may be input to the fusion module 134b. The fusion module 134b may generate a third depth map F_DMb of the second image W_IMGb by performing the fusion operation on the propagated first depth map S_DMb and the tone-mapped second depth map M_DMb based on the previously set fusion algorithm. A post-processing module 136b may generate a post-processed third depth map I_DMb by performing a post-processing operation based on the third depth map F_DMb.

Figure 14:
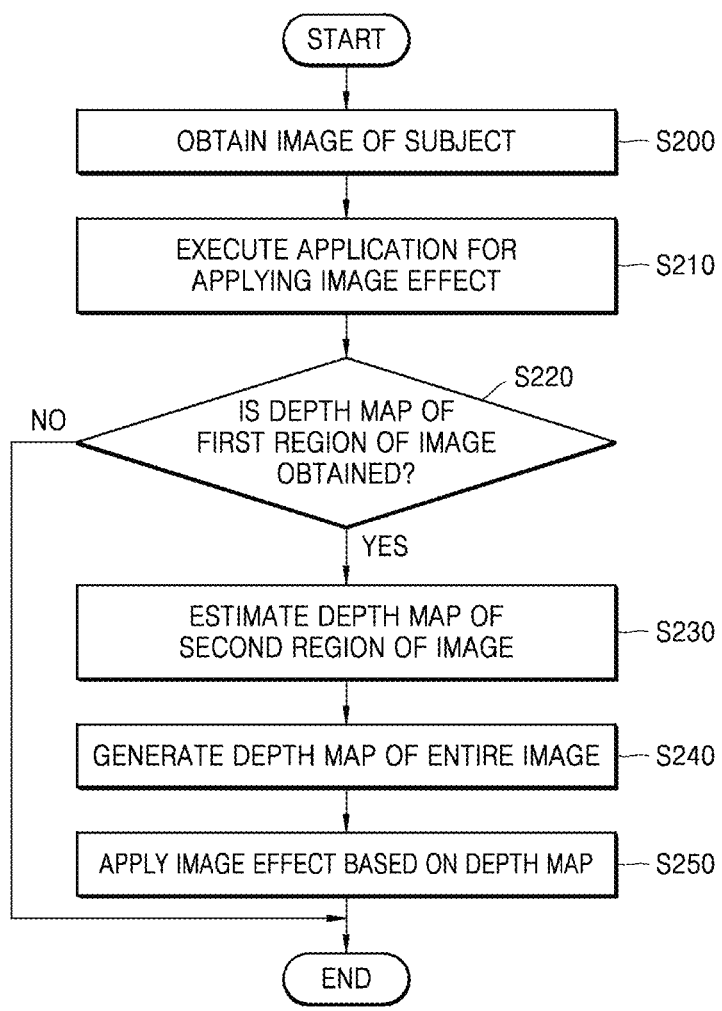
FIG. 14 is a flowchart summarizing in another example a method of operating an electronic apparatus according to an embodiment of the inventive concept.

FIG. 14 is a flowchart summarizing still another example of a method of operating the electronic apparatus 10 according to an embodiments of the inventive concept.

Referring to FIG. 14 in the context of the preceding exemplary embodiments, the electronic apparatus 10 may be used to obtain an image of a subject (or object) (S200). As before, the electronic apparatus 10 may include the first camera module 20 and the second camera module 30, and may obtain the first image N_IMG of the object with a first field of view by the first camera module 20 and the second image W_IMG of the subject with a second field of view by the second camera module 30. For example, the first image N_IMG is based on the narrow field of view and the second image W_IMG may be based on the wide field of view.

Next, the electronic apparatus 10 may execute an application to apply an image effect (S210). Here, the application may be stored in the memory 50 and may be executed by the processor 100 in response to an externally provide command. In this regard, the application applying the image effect may be related to at least one of auto-focusing, out-focusing, fore/background separation, face recognition/detection, object detection within a frame, and augmented reality.

Next, the electronic apparatus 10 may determine whether the depth map of the first region A1 of the second image W_IMG has been obtained (S220). The first region A1 may be common to the first image N_IMG in the second image W_IMG. In an exemplary embodiment, the electronic apparatus 10 includes the first depth map generator 110 and the first depth map generator 110 may obtain the depth map (or the first depth map N_DM) of the first region A1 based on the first image N_IMG and the second image W_IMG.

When the depth map of the first image A1 is obtained, the electronic apparatus 10 may estimate the depth map of the second region A2 of the second image W_IMG (S230). The second region A2 may be a remaining region excluding the first region A1 in the second image W_IMG. In an exemplary embodiment, the electronic apparatus 10 includes the second depth map generator 120 and the second depth map generator 120 may estimate the depth map of the second region A2 based on the first image N_IMG, the second image W_IMG, and the first depth map N_DM.

Next, the electronic apparatus 10 may generate the depth map of an entire image, that is, the second image W_IMG (S240). In an exemplary embodiment, the second depth map generator 120 may generate the second depth map W_DM of the second image W_IMG based on the first depth map N_DM and the estimated depth map of the second region A2. In another exemplary embodiment, the electronic apparatus 10 further includes a depth map fusion unit 130a and the depth map fusion unit 130a may generate the third depth map I_DMa of the second image W_IMG by performing a specific operation on the first depth map N_DM and the second depth map W_DM and performing the fusion operation.

Next, the electronic apparatus 10 may apply the image effect to the second image W_IMG based on the generated depth map (S250). For example, when the auto-focusing is applied as the image effect, the electronic apparatus 10 may vary a focus in accordance with depth of each pixel based on the depth map of the second image W_IMAG. According to the current embodiment, the electronic apparatus 10 may perform various image effects having improved quality on the obtained image by obtaining a depth map with improved picture quality.

Figure 15:
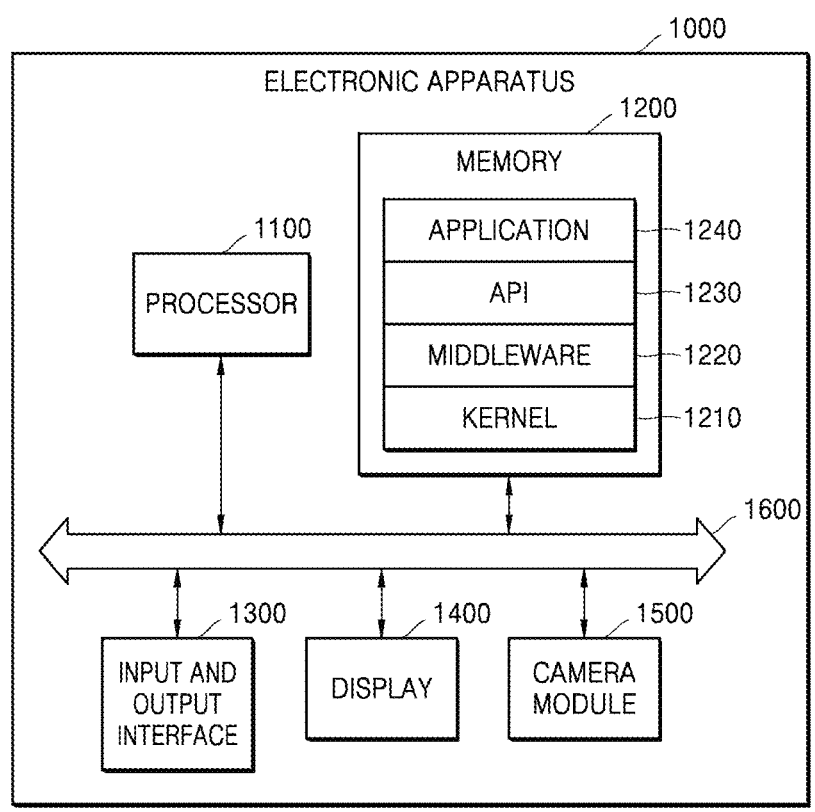
FIG. 15 is a block diagram illustrating an electronic apparatus according to an embodiment of the inventive concept.

FIG. 15 is a block diagram illustrating one possible configuration for an electronic apparatus 1000 according to an embodiments of the inventive concept.

Referring to FIG. 15, the electronic apparatus 1000 may include a processor 1100, a memory 1200, an input and output interface 1300, a display 1400, a camera module 1500, and a bus 1600. In addition, although not shown in the drawing, the electronic apparatus 1000 may additionally include various components such as a communication module.

The bus 1600 may include a circuit for connecting the components included in the electronic apparatus 1000 and transmitting a control signal or data between the components. The processor 1100 may include one or more among a central processing unit (CPU), an application processor, and a communication processor. In an exemplary embodiment, the processor 1100 may perform various operations related to the above-described depth map generation in FIGS. 1 to 14. For example, at least as part of apparatus(es)—including individual or collective modules, functions, etc.—and/or methods of operating same according to the embodiments of the inventive concept may be implemented by a command stored in a computer-readable storage medium in the form of a program module. When the command is executed by the processor 1100, the processor 1100 may perform a function corresponding to the command. The computer-readable storage medium may be the memory 1200.

The memory 1200 as a program (or software) may include a kernel 1210, middleware 1220, an application programming interface (API) 1230, and an application 1240. At least a part of the kernel 1210, the middleware 1220, and the API 1230 may be referred to as an operating system. The kernel 1210 may control or manage system resources (for example, the bus 1600, the processor 1100, or the memory 1200) used for executing an operation or a function implemented in a program. The middleware 1220 may act as a go-between and accordingly, the API 1230 or the application 1240 communicates with the kernel 1210 and may receive data. The application 1240 may be implemented to perform various image effects on an image obtained by the camera module 1500.

The input and output interface 1300 transmits a command or data input from the user or another external device to other components of the electronic apparatus 100 or may output the command or the data received from other components of the electronic apparatus 1000 to the user or another external device. The display 1400 may display an image obtained by the camera module 1500 to the outside. Alternatively, the display 1400 may display an image to which the image effect is applied by the application 1240 in the processor 1100 to the outside.

The camera module 1500 may obtain an image of a subject by performing capturing in response to an input from the outside. In an exemplary embodiment, the camera module 1500 may include a first camera module and a second camera module for obtaining images with different fields of view.

While the inventive concept has been particularly shown and described with reference to embodiments thereof, it will be understood that various changes in form and details may be made therein without departing from the spirit and scope of the following claims.

What is claimed is:

1. An apparatus comprising:
a first camera module configured to obtain a first image of an object with a first field of view;
a second camera module configured to obtain a second image of the object with a second field of view different from the first field of view;
a first depth map generator configured to generate a first depth map of the first image based on the first image and the second image; and
a second depth map generator configured to generate a second depth map of the second image based on the first image, the second image, and the first depth map.

2. The apparatus of claim 1, wherein the first field of view is a narrow angle and the second field of view is a wider angle.

3. The apparatus of claim 2, wherein the second image is divided into a primary region and a residual region, and
the second depth map generator comprises:
a relationship estimating module configured to estimate a relationship between the primary region and the residual region based on the first image and the second image; and
a depth map estimating module configured to estimate a depth map of the residual region based on the estimated relationship and the first depth map.

4. The apparatus of claim 3, wherein at least one of the relationship estimating module and the depth map estimating module performs an estimating operation based on a neural network module.

5. The apparatus of claim 1, further comprising:
a depth map fusion unit configured to generate a third depth map of the second image by performing a fusion operation based on the first depth map and the second depth map.

6. The apparatus of claim 5, wherein the depth map fusion unit comprises:
a tone mapping module configured to generate a tone-mapped second depth map to correspond to the first depth map by performing a bias removing operation on the second depth map; and
a fusion module configured to generate the third depth map by fusing the tone-mapped second depth map and the first depth map.

7. The apparatus of claim 6, wherein the depth map fusion unit further comprises a propagating module configured to generate a propagated first depth map in the second image by iterated propagating of the first depth map based on the first depth map and the second image, and
the fusion module generates the third depth map by fusing the tone-mapped second depth map and the propagated first depth map.

8. The apparatus of claim 6, wherein the depth map fusion unit further comprises a post-processing module configured to perform a post-processing operation on the third depth map generated by the fusion module to provide the post-processed third depth map.

9. The apparatus of claim 8, wherein the post-processing module performs the post-processing operation by filtering an interface generated in the third depth map in accordance with fusion of the fusion module.

10. The apparatus of claim 8, wherein the post-processing module removes artifacts generated in the third depth map in accordance with fusion of the fusion module.

11. The apparatus of claim 1, wherein the first depth map generator analyses a distance relationship between the first image and the second image, and generates a first depth map of the first image based on the distance relationship.

12. A method of processing an image of an electronic apparatus, the method comprising:
obtaining a first image of an object using a first camera module;
obtaining a second image of the object using a second camera module;
generating a first depth map of the first image based on the first image and the second image;
estimating a relationship between a primary region of the second image and a residual region of the second image based on the first image and the second image; and
generating a second depth map of the second image based on the estimated relationship between the primary region and the residual region, and the first depth map.

13. The method of claim 12, wherein the electronic apparatus comprises a first camera module including a first lens having a first field of view and a second camera module including a second lens having a second field of view wider than the first field of view.

14. The method of claim 13, wherein the generating of the second depth map comprises:
estimating a depth map of the residual region based on the estimated relationship between the primary region and the residual region, and the first depth map; and
generating the second depth map based on a depth map of the residual region and the first depth map.

15. The method of claim 12, wherein the estimating of the relationship between a primary region of the second image is performed using a neural network model.

16. The method of claim 12, further comprising:
performing a pre-processing operation on the second depth map; and
generating a third depth map of the residual image by fusing the second depth map on which the pre-processing operation is performed and the first depth map.

17. The method of claim 16, wherein the performing of the pre-processing operation comprises performing a tone mapping operation between a depth map of the primary region and a depth map of the residual region based on the second depth map.

18. An operating method for an electronic apparatus,
the electronic apparatus including; a first camera module providing a first image of an object using a first field of view and a second camera module providing a second image of the object using second field of view wider than the first field of view, and
a processor generating a depth map of the second image based on a primary region of the second image and a residual region of the second image,
the operating method comprising:
generating a first depth map of the primary region by estimating a relationship between the first image and the second image;
estimating a relationship between the primary region and the residual region based on the first image and the second image;
generating a second depth map of the second image by estimating a depth map of the second region based on the estimated relationship between the primary region and the residual region; and
generating a depth map of the second image by fusing the first depth map and the second depth map.

19. The operation method of claim 18, further comprising:
executing an application that applies an image effect to the second image based on a depth map of the residual image.

20. The operation method of claim 19, wherein the application applies at least one image effect of auto-focusing, out-focusing, fore/background separation, face recognition, object detection within a frame, and augmented reality to the second image based on a depth map of the second image.

* * * * *